US007802179B2

(12) United States Patent
Bissonnette et al.

(10) Patent No.: US 7,802,179 B2
(45) Date of Patent: Sep. 21, 2010

(54) SYNCHRONIZING DATA BETWEEN DIFFERENT EDITOR VIEWS

(75) Inventors: Charles Y. Bissonnette, Snoqualmie, WA (US); Mikhail E. Arkhipov, Woodinville, WA (US); Sam Spencer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 11/614,240

(22) Filed: Dec. 21, 2006

(65) Prior Publication Data

US 2008/0155397 A1     Jun. 26, 2008

(51) Int. Cl.
*G06F 17/00* (2006.01)
*G06F 17/20* (2006.01)

(52) U.S. Cl. ................. 715/229; 715/234; 715/255; 715/256

(58) Field of Classification Search ............... 715/229, 715/234, 255, 256; 707/203
See application file for complete search history.

(56) References Cited

U.S. PATENT DOCUMENTS

| | | | | |
|---|---|---|---|---|
| 6,585,777 | B1 | 7/2003 | Ramaley et al. | 715/513 |
| 6,674,924 | B2 | 1/2004 | Wright et al. | 382/306 |
| 6,834,306 | B1* | 12/2004 | Tsimelzon | 709/228 |
| 6,848,078 | B1 | 1/2005 | Birsan et al. | 715/511 |
| 6,907,420 | B2 | 6/2005 | Gensel | 707/1 |
| 6,959,416 | B2 | 10/2005 | Manning et al. | 715/513 |
| 6,963,930 | B2* | 11/2005 | Halpert et al. | 709/246 |
| 7,080,083 | B2 | 7/2006 | Kim et al. | 707/100 |
| 7,316,003 | B1* | 1/2008 | Dulepet et al. | 717/111 |
| 7,454,745 | B2* | 11/2008 | Aridor et al. | 717/122 |
| 2004/0123186 | A1* | 6/2004 | Kulp et al. | 714/38 |
| 2008/0092168 | A1* | 4/2008 | Logan et al. | 725/44 |
| 2008/0313535 | A1* | 12/2008 | Storisteanu | 715/256 |

OTHER PUBLICATIONS

Adaptive XML Inclusions for the Effective Support of Hybrid Learning, By Pitner, pp. 601-608 Proceedings of I-Know 2004, Graz, Austria, Jun. 30-Jul. 2, 2004 Masaryk University in Brno, Czech Republic.*

The Redwood Programming Environment, A thesis submitted in partial fulfillment of the requirements for the degree of Master of Science with a major in Computer Science. by Brian T. Westphal, Aug. 2004, pp. 1-82.*

(Continued)

*Primary Examiner*—Stephen S Hong
*Assistant Examiner*—Ahamed I Nazar
(74) *Attorney, Agent, or Firm*—Workman Nydegger

(57) ABSTRACT

The present invention extends to methods, systems, and computer program products for synchronizing data between different editor views. Embodiments of the present invention can be used to incrementally parse a portion of a document using a mark-up language (e.g., HTML) snippet. The parsed snippet is then merged back into the main document. Accordingly, code changes in a text view can be integrated into a design view's main document structure (e.g., parse tree) such that the preservation information for the parsed snippet is merged with the preservation information for the rest of the document. Fully reparsing the document is not required and incremental reparsing can be done in automated fashion. Thus, a document can be automatically re-outputted with full preservation of what the document would have looked like in code view without fully reparsing the document.

18 Claims, 3 Drawing Sheets

OTHER PUBLICATIONS

Structuring Home Video by Snippet Detection and Pattern Parsing, By Pan et al. Department of Computer Science, City University of Hong Kong, Tat Chee Avenue, Kowloon, Hong Kong Mir'04, Oct. 15-16, 2004, New York, New York, USA. pp. 69-76.*

Intentional Software by Simonyi et al. Intentional Software Corporation, 500 108th Ave NE, #1050, Bellevue, WA, 98004, OOPSLA'06 Oct. 22-26, 2006, Portland, Oregon, USA. pp. 451-463.*

* cited by examiner

SYNCHRONIZING DATA BETWEEN DIFFERENT EDITOR VIEWS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

Some Web page development environments offer the possibility to provide different views for the HTML document edited and display simultaneously. This capability is common referred as "Split View". Such environments offers a code (or text) view and a design (or graphical) view. For example, an editor can present HyperText Markup Language (HTML) code in a code view and the output of executing the HTML code in a corresponding what-you-see-is-what-you-get (WYSIWIG) design view (e.g., representing what will be presented to an end-user who accesses the Web page). Accordingly, a developer can make changes in either the code view or the design view to alter Web page functionality.

Split view Web page editors typically include a code generator that can automatically generate well formed HTML (and/or other) code based on a known scope of design view changes. In design view, since a developer is typically working with graphical elements, the scope of changes is relatively easy to determine. Thus, when a change is detected in design view, the code generator generates corresponding HTML (and/or other) code representing the design view change. Since the code generator is configured to generate well formed HTML (and/or other) code, the generated HTML (and/or other) code can be integrated back into the appropriate location in the code view without requiring to reparse the entire document the code view is currently displaying. Accordingly, changes made in a design view can typically get reflected back into the code view almost immediately.

However, it is much more difficult to propagate changes made in code view into the design view. In code view, a developer can type any text, including non-well formed HTML, in any location. That is, a developer can insert any HTML element, or worse part of an element, in any location within the code view. Without reparsing code changes, there is no way to determine if code changes are appropriate or even safe to execute without disrupting the visual representation of what the document should look like with the change.

Even small changes to HTML can significantly change a visual representation presented in a design view. For example, insertion of a "</body>" instruction in the middle of existing HTML instructions can (potentially significantly and detrimentally) alter a previous design view representation of the existing HTML instructions. Accordingly, split view editors typically do not include any internal automated functionality to reflect incremental code view changes immediately into a corresponding design view representation.

Instead, split view editors typically require a developer to issue a special external command or completely reload the entire Web page when code view changes are made. Execution of an external command or reloading an entire Web page permits reparsing to insure that the code changes are appropriate. However, either of these options requires a developer to perform time consuming external activities that reduce the time available for code development. In particular, reloading an entire Web page to obtain a design view representation of relatively minor code view changes can significantly reduce developer efficiency.

BRIEF SUMMARY

The present invention extends to methods, systems, and computer program products for synchronizing data between different editor views (e.g., with each view having differing document-view architectures). A "split view" editor loads mark-up language instructions of a document into a design view (e.g., a WYSIWIG HTML editor) that represents a graphical part of the split view, into a text view that represents the text part of the split view, and into a text view buffer. The mark-up language instructions in the text view of the document are parsed to create a text view Document Object Model ("DOM") (e.g., text view parse tree) that is stored in memory. The mark-up language instructions in the design view of the document are parsed to create a design view DOM (e.g., design view parse tree) that is stored in memory.

A change is detected in the text view of the document. The type of the detected change is identified from among inserting, deleting, and changing text. A change start location of the detected change is identified within text in the text view buffer. A change end location of the detected change is identified within the text view buffer. The portion of text between the change start location and the change end location represents the excise region of changed text that is to be synchronized in the design view while preserving the existing characteristics of other mark-up language in the document.

The text view buffer is inspected from the start change location towards the beginning of the text view buffer to identify a scope start location. The text view buffer is inspected from the change end location towards the end of the of the text view buffer to identify a scope end location. The portion of the text view buffer between the scope start location and the scope end location indicates a scoped output region considered to be safe for transfer to the design view.

It is determined that it is safe to use incremental parsing in the excised region of the document based on the contents of the scoped output region. Mark-up language corresponding to the excised region of the document is accessed. The accessed mark-up language is inserted into the excise region of the document. The accessed mark-up language is transferred to a design view parse tree used by the design view to render the document such that the detected change is synchronized between the text view and the design view. The design view parse tree is rendered to represent the detected change from the text view within the design view.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
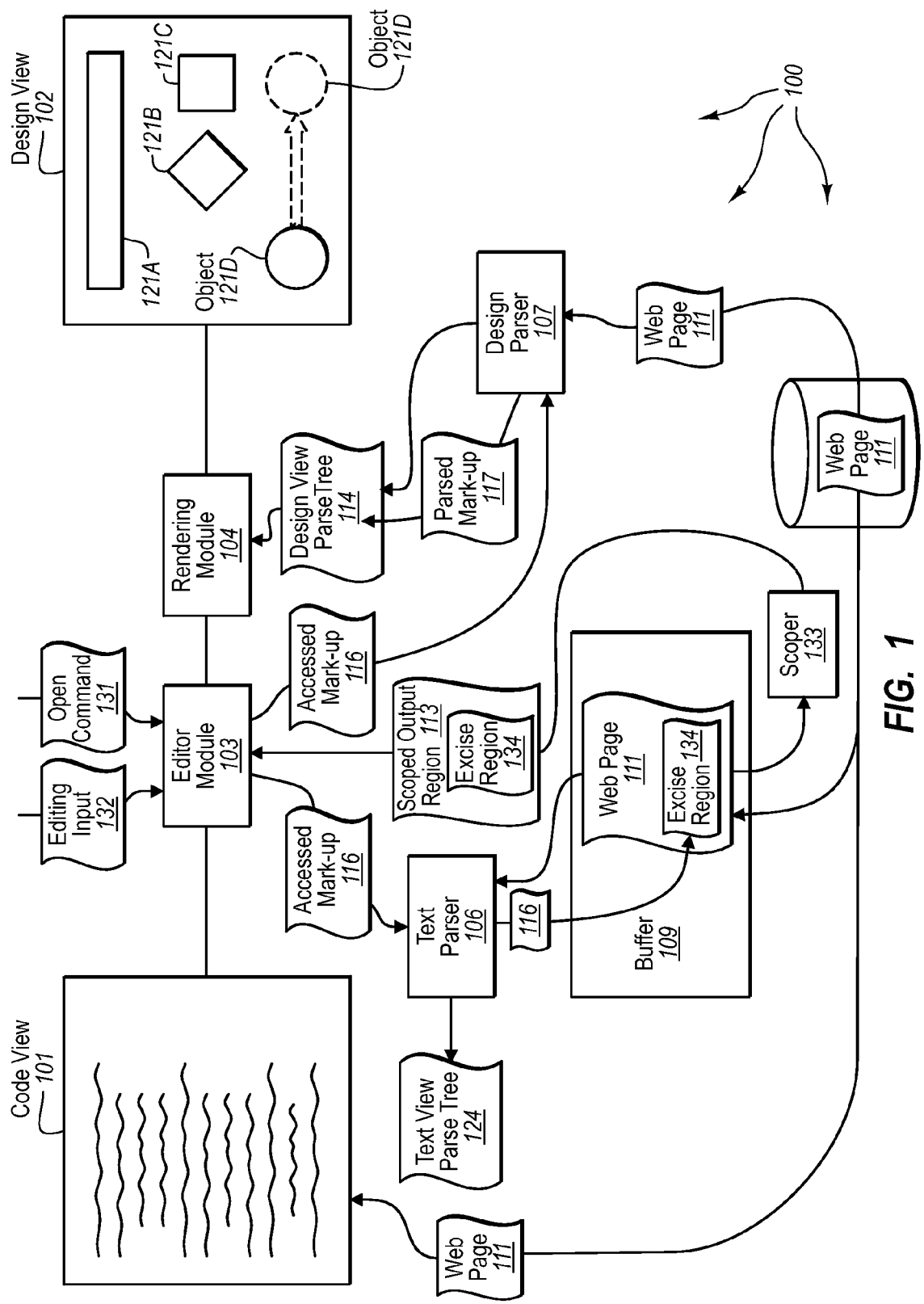
FIG. 1 illustrates an example computer architecture that facilitates synchronizing data between different editor views.

The present invention extends to methods, systems, and computer program products for synchronizing data between different editor views (e.g., with each view having differing document-view architectures). A "split view" editor loads mark-up language instructions of a document into a design view (e.g., a WYSIWIG HTML editor) that represents a graphical part of the document into a text view that represents the text part of document, and into a text view buffer that represents the actual document internally. The mark-up language instructions in the text view of the document are parsed to create a text view Document Object Model ("DOM") (text view parse tree) that is stored in memory. The mark-up language instructions in the design view of the document are parsed to create a design view DOM (e.g., design view parse tree) that is stored in memory.

A change is detected in the text view of the document. The type of the detected change is identified from among inserting, deleting, and changing text. A change start location of the detected change is identified within text in the text view buffer. A change end location of the detected change is identified within the text view buffer. The portion of text between the change start location and the change end location represents the excise region of changed text that is to be synchronized in the design view while preserving the existing characteristics of other mark-up language in the document.

The text view buffer is inspected from the start change location towards the beginning of the text view buffer to identify a scope start location. The text view buffer is inspected from the change end location towards the end of the of the text view buffer to identify a scope end location. The portion of the text view buffer between the scope start location and the scope end location indicates a scoped output region considered to be safe for transfer to the graphical view.

It is determined that it is safe to use incremental parsing in the excised region of the document based on the contents of the scoped output region. Mark-up language corresponding to the excise region of the document is accessed. The accessed mark-up language is inserted into the excise region of the document. The accessed mark-up language is transferred to a design view parse tree used by the design view to render the document such that the detected change is synchronized between the text view and the design view. The design view parse tree is rendered to represent the detected change from the text view within the design view.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates synchronizing data between different editor views. As depicted, computer architecture 100 includes editor module 103, rendering module 104, text parser 106, design parser 107, buffer 109, and scoper 133. Editor module 103, rendering module 104, text parser 106, design parser 107, buffer 109, and scoper 133 may interoperate as part of a document development infrastructure, such as, for example, a Web page development environment.

Editor module 101 is configured to control the loading, editing, and, saving of documents, such as, for example, Web pages including HyperText Markup Language ("HTML") instructions. In response to an open command (either automated or user-input), editor module 103 can cause a Web page or other document to be loaded into code view 101 and design view 102. Code view 101 and design view 102 can utilize different formats for internally storing and representing loaded documents.

More specifically, when a document is loaded, the document can be transferred to text parser 106 and design parser 107. Text parser 106 can parse the document into a text view parse tree, for example, a text view Document Object Model ("DOM") that is renderable in code view 101. On the other hand, design parser 107 can parse the document into a design view parse tree, for example, a design view DOM that is renderable in design view 102. Text view parse trees and design view parse trees can be stored memory.

A design view parse tree can then be transferred to rendering module 104. Rendering module 104 can render the instructions included in the design view parse tree in design view 102. Thus, design view 102 can reflect what a Web browser can (or will likely) render from processing corresponding instructions (e.g., HTML tags, scripts, etc) presented in code view 101.

Buffer 109 is configured to store the text of documents loaded into code view 101. Thus, when a document is loaded into code view 101, it can also be stored in buffer 109 and made accessible to text parser 106 and design parser 107.

Scoper 133 is configured to interoperate with text parser 106 and a corresponding text view parse tree for a document to determine a valid portion of the document that is to be reparsed such that full preservation of new mark-up instructions and existing mark-up instructions is possible. That is, scoper 133 can identify regions of text in buffer 109 that can be safely excised and replaced in manner that has little, if any, impact on other surrounding instructions. Accordingly, scoper 133 can access text from buffer 109, and interoperate with text parser 106 and a corresponding text view parse tree to identify a region within the corresponding text of a document that can be excised and replaced.

Figure 4:
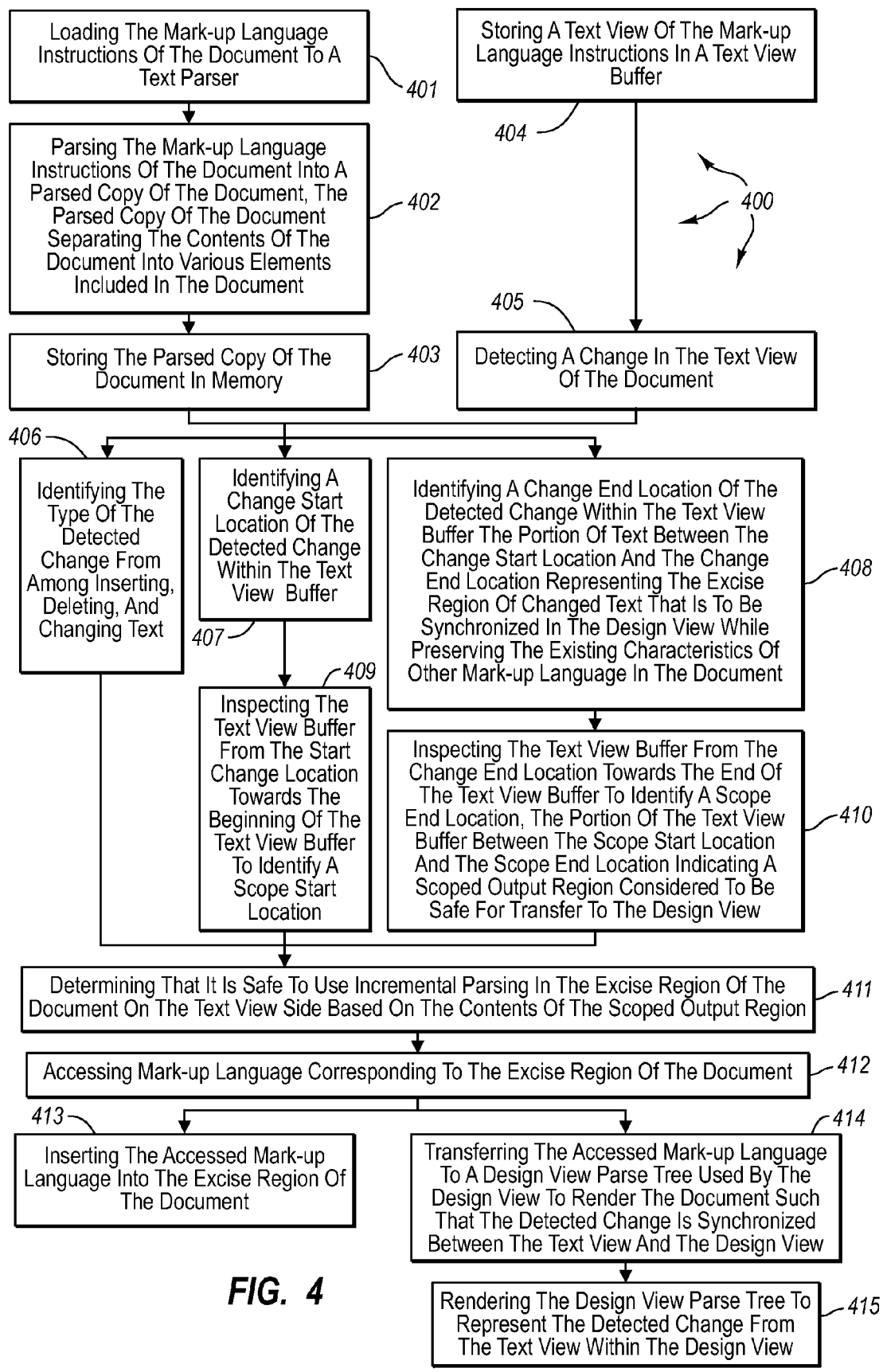
FIG. 4 illustrates a flow chart of an example method for synchronizing data between different editor views.

FIG. 4 illustrates a flow chart of an example method 400 for synchronizing data between different editor views. Method 400 will be described with respect to the components and data of computer architecture 100.

Method 400 includes an act of loading mark-up language instructions of a document to a parser (act 401). For example, in response to open command 131, Web page 111 can be loaded into text parser 106. At or near the same time, and also in response to open commend 131, Web page 111 can be loaded into design parser 107.

Method 400 includes an act of parsing the mark-up language instructions of the document into a parsed copy of the document, the parsed copy of the document separating the contents of the document into various elements included in the document (act 402). For example, text parser 106 can parse mark-up language instructions of Web page 111 into text view parse tree 124 (a text view DOM). Text view parse tree 124 can separate the contents of Web page 111 into various mark-up language (e.g., HTML) elements included in Web page 111 in a format that is renderable in code view 101. Likewise, design view parser 107 can parse mark-up language instructions of Web page 111 into design view parse tree 114 (a text view DOM). Design view parse tree 114 can separate the contents of Web page 111 into various mark-up language (e.g., HTML) elements included in Web page 111 in a format that is renderable in design view 102.

Design parser 107 can then transfer design view parse tree 114 to rendering module 104. Rendering module 104 can render instructions (e.g., HTML instructions) included in design view parse tree 114 within design view 102. For example, rendering module 104 can render objects 121A through 121D in design view 102. However, different and/or other additional instructions can be processed to render other Web based content.

Method 400 includes an act of storing the parsed copy of the document in a memory (act 403). For example, text parser 106 can store text view parse tree 124 in memory. Similarly, design view parser 107 can store design view parse tree 114 in memory Method 400 includes an act of storing a text view of the mark-up language instructions in a text view buffer (act 404). For example, a text view of the mark-up language instructions of Web page 111 can be stored in buffer 109.

Method 400 includes an act of detecting a change in the text view of the document (act 405). For example, in response to editing input 132, editor module 103 can detected a change in the text of Web page 111 presented in code view 101. Editing input 132 can be automated or user input for inserting, deleting, or changing the text of Web page 111. Method 400 includes an act of identifying the type of the detected change from among inserting, deleting, and changing text (act 406). For example editor module 103 can identify the type of detected change to Web page 111, from among inserting, deleting, and changing text, implemented in response to editing input 132.

Method 400 includes an act of identifying a change start location of the detected change within the text view buffer (act 407). For example, editor module 103 and text parser 106 can interoperate with text view parse tree 124 to identify a change start location for Web page 111 within buffer 109. Method 400 includes an act of identifying a change end location of the detected change within the text view buffer, the portion of text between the change start location and the change end location representing the excise region of the changed text that is to be synchronized in the design view while preserving the existing characteristics of other mark-up language in the document (act 408). For example, editor module 103 and text parser 106 can interoperate with text view parse tree 124 to identify a change end location corresponding to a detected change for Web page 111 within buffer 109.

Figure 2:
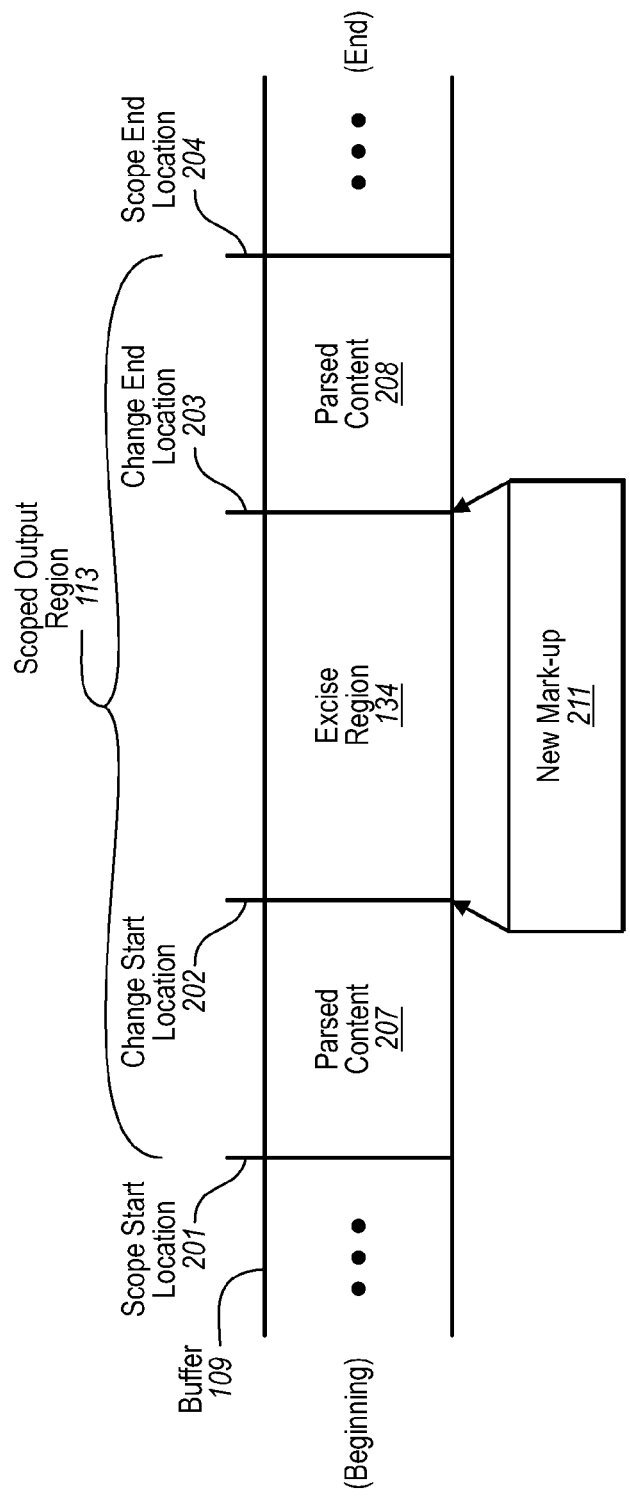
FIG. 2 illustrates an example text buffer for storing parsed mark-up language.

Referring briefly now to FIG. 2, FIG. 2 illustrates an expanded view of buffer 109 for storing a text view of mark-up language. As depicted, change start location 202 and change end location 203 bound excise region 134. Excise region 134 is a region within Web page 111 that corresponds to text inserted, deleted, or modified by the detected change to Web page 111 in code view 101.

Referring back to FIG. 4, method 400 includes an act of inspecting the text view buffer from the start change location towards the beginning of the text view buffer to identify a scope start location (act 409). For example, scoper 133 and text parser 106 can interoperate with text view parse tree 125 to inspect buffer 109 from the start change location towards the beginning of buffer 109 to identify a scope start location. Method 400 includes an act of inspecting the text view buffer from the change end location towards the end of the text view buffer to identifying a scope end location, the portion of the text view buffer between the scope start location and the scope end location indicating a scoped output region considered to be safe for transfer to the design view (act 410). For example, scoper 133 and text parser 106 can interoperate with text view parse tree 125 to inspect buffer 109 from the end change location towards the end of buffer 109 to identify a scope end location.

Generally, scoping refers to determining both a start scope location and an end scope location where scoper 133 determines it is safe to perform an incremental update. Thus, referring again to FIG. 2, buffer 109 can be inspected from change start location 202 toward the beginning of buffer 109 to identify scope start location 201. Likewise, buffer 109 can be inspected from change end location 203 towards the end of buffer 109 to identify scope end location 204. Scoped output region 206 is a region within the visited Web page 111 that corresponds to markup content that can be safely excised, incrementally parsed, and replaced with little, if any, impact on other surrounding markup.

Identifying an appropriate scoped output region can be based on one or more of a variety of different scoping rules. In some embodiments, scoper 133 attempts to identify atomic elements, such as, for example, content between a start tag and corresponding end tag at the same level. Scoper 133 can inspect from the change start location 202 towards the beginning of buffer 109 until a start tag is reached. Likewise, scoper 133 can inspect from change end location 203 towards the end of buffer 109 until an end tag is reached. Scoper 133 can compare the start tag and end tag to determine if they are at the same level.

If the start tag and end tag are not at the same level, scoper 133 can continue inspecting further in the direction (either towards the start or towards the end) that has the lower level tag. Thus, scoper 133 can continues inspecting until a start tag and end tag are at the same level.

Figure 3:
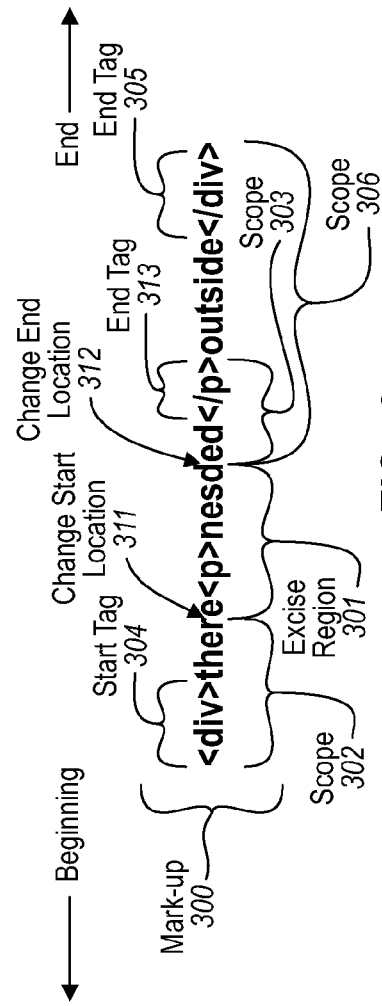
FIG. 3 illustrates an example portion of parsed mark-up language from a text buffer.

Referring to FIG. 3, FIG. 3 illustrates an example portion of parsed mark-up language 300 from a text buffer. Change start location 311 and change end location 312 bound excise region 301 indicating indicates a portion of a Web page corresponding to a detected change. Scoper 133 can inspect from change start location 311 towards the beginning of the buffer and can inspect from change end location 312 towards the end of the buffer.

Inspecting towards the beginning of the buffer, scoper 133 can encounter start tag 304 indicating scope 302. Inspecting towards the end of the buffer, scoper 133 can encounter end tag 313 indicating scope 303. However, scoper 133 can compare start tag 304 and end tag 303 and determine that start tag 304 is at a higher level than end tag 303 within a parsed document. Accordingly, scoper 133 can continue to inspect from end tag 313 towards the end of the buffer.

Scoper 133 can then encounter end tag 305 indicating scope 306. Scoper 133 can compare start tag 304 and end tag 305 and determine that start tag 304 and end tag 305 are at the same level within the parsed document. Scoper 133 can then determine if text between (and potentially including) start tag 304 and end tag 305 can be safely excised and replaced.

Referring back to FIG. 4, method 400 includes an act of determining that it is safe to use incremental parsing in the excise region of the document on the text view side based on the contents of the scoped output region (act 411). For example, scoper 133 can determine that it is safe to use incremental parsing on excise region 134 based on the contents of scoped output region 206.

In some embodiments, scoper 133 determines if it is safe to use incremental parsing (e.g., excising and replacing text) on a change by determining if the change is an incremental change. Some examples of incremental changes include plain text changes, changes completely enclosing an element or multiple elements, changes to element attribute sets, changes to element attribute values, and addition of well-formed mark-up.

Detection of malformed tags can indicate that a change of text is not suitable for incremental parsing. For example, if a tag is not appropriately delimited, such as, for example, does not include "<", ">" or for an end tag does not include "/".

Scoper 133 can send scoped output region 113, including excise region 134, to editor module 103.

Method 400 includes an act of accessing mark-up language corresponding to the excise region of the document (act 412). For example, editor module 103 can access accessed mark-up 116 from code view 101 corresponding to the detected change for editing input 132. Method 400 includes an act of inserting the accessed mark-up language into the excise region of the document (act 413). For example, editor module 103 can transfer accessed mark-up 116 to text parser 106. Text parser 106 can in turn insert accessed mark-up 116 into excise region 134 (within text view parse tree 124). The accessed mark-up can also be stored in the appropriate location within buffer 109.

Method 400 includes an act of transferring the accessed mark-up language to a design view parse tree used by the design view to render the document such that the change is synchronized between the text view and the design view (act 414). For example, editor module 103 can transfer accessed mark-up 116 to design parser 107. Design parser 107 can parse accessed mark-up 116 into parsed mark-up 117 (e.g., stored in a temporary parse tree). Design parser 107 can then integrate parsed mark-up 117 into design view parse tree 114 such that the detected change corresponding to editing input 132 is synchronized between code view 101 and design view 102.

Method 400 includes an act of rendering the design view parse tree to represent the detected change from the text view within the design view (act 415). For example, rendering module 104 can render design view parse tree 114 in design view 102 to represent the detected change from code view 101 (corresponding to editing input 132) within design view 102. A detected change in code view 101 can cause objects in design view 102 to be relocated. For example, as depicted by the dashed lines, the position of object 121D can be changed when implementing an incremental change. However, a variety of other changes in design view 102 can also result from incremental changes detected in code view 101.

Embodiments of the present invention can be used to incrementally parse a portion of a document using a mark-up language (e.g., HTML) snippet. The parsed snippet is then merged back into the main document. Accordingly, code changes in a text view can be integrated into a design view's main document structure (e.g., parse tree) such that the preservation information for the parsed snippet is merged with the preservation information for the rest of the document. Fully reparsing the document is not required and incremental reparsing can be done in automated fashion. Thus, a document can be automatically re-outputted with full preservation of what the document would have looked like in code view without fully reparsing the document.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including an editor having a text view and a design view for editing documents, the text view configured to receive text representing instructions of a mark-up language, the design view configured to interpret the mark-up language and to render corresponding output, a method for automatically synchronizing the rendered output of the design view with an incremental change made in the text view, the method comprising:

an act of storing a text view of mark-up language instructions of a document in a text view buffer;

an act of detecting a change in the text view of the document within the text view buffer, the change spanning multiple mark-up language elements within the mark-up language instructions;

an act of identifying the type of the detected change from among inserting, deleting, and changing text;

an act of identifying an excise region of changed text for the detecting change, the excise region containing a region of changed text that is to be synchronized with the design view, identifying the excise region including:

an act of identifying a change start location of the detected change within the text view buffer;

an act of identifying a change end location of the detected change within the text view buffer; and an act of determining that the portion of text between the change start location and the change end location is the excise region;

an act of identifying a scoped output region, the scoped output region indicating mark-up language elements potentially impacted by the detected change by being at least partially within the excise region based on the level of the mark-up language elements within the mark-up language instructions, identifying the scoped output region including:

an act of inspecting the text view buffer from the start change location towards the beginning of the text view buffer to identify a scope start location, the scope start location indicating the beginning of the start tag corresponding to the first mark-up language element at least partially within the excise region;

an act of inspecting the text view buffer from the change end location towards the end of the text view buffer to identify a scope end location, the scope end location indicating the end of the end tag corresponding to the start tag at the same level within the mark-up language instructions; and an act of determining that the text from the beginning of the start tag to the end of the end tag is the scope output region;

an act of determining that it is safe to use incremental parsing to re-parse the excise region of the document based on mark-up language elements contained in the scoped output region;

an act of re-parsing the excise region to generate further mark-up language instructions for insertion into the excise region without having to re-parse the entire document;

an act of inserting the further mark-up language instructions into the excise region to implement the detected change;

an act of integrating the further mark-up language instructions into a design view parse tree used by the design view to render the document such that the detected change is synchronized between the text view and the design view; and an act of rendering the design view parse tree to represent the detected change from text view within the design view.

2. The method as recited in claim 1, further comprising prior to detecting a change in the text view of the document:

an act of loading the mark-up language instructions of the document to a text parser;

an act of the text parser parsing the mark-up language instructions of the document into a parsed copy of the document, the parsed copy of the document separating the contents of the document into various elements included in the document; and an act of storing the parsed copy of the document in memory.

3. The method as recited in claim 2, wherein the act of parsing the text view buffer from the start change location towards the beginning of the parsed copy of the document comprises an act of the text parser parsing the text view buffer from start change location towards the beginning of the text view buffer; and wherein the act of the parsing the text view buffer from the change end location towards the end of the parsed copy of the document comprises an act of the text parser parsing the text view buffer from the change end location towards the end of the text view buffer.

4. The method as recited in claim 1, further comprising:

an act of a design view parser parsing the generated mark-up language prior to transferring the parsed generated mark-up language to the parse tree used by the design view.

5. The method as recited in claim 1, wherein the act of detecting a change in the text view of the document comprises an act of detecting a change to HTML instructions in the text view.

6. The method as recited in claim 5, wherein the act of detecting a change to HTML instructions in the text view comprises an act of detecting one of a plain text change, a change completely enclosing an HTML element, a change completely enclosing multiple HTML elements, a change to HTML element attribute sets, and a change to HTML element attribute values.

7. The method as recited in claim 1, wherein the act of re-parsing the excise region to generate further mark-up language instructions for insertion into the excise region comprises an act of re-parsing a portion of HTML instructions.

8. The method as recited in claim 1, wherein the act of inserting the further mark-up language instructions into the excise region to implement the detected change comprises an act of inserting the further mark-up language instructions back into the text view buffer.

9. The method as recited in claim 1, further comprising:
an act of storing the further mark-up language instructions in a temporary parse tree prior to transferring the accessed mark-up language to the design view parse tree.

10. The method as recited in claim 1, wherein the act of rendering the design view parse tree to represent the detected change from text view within the design view comprises an act of rendering HTML instructions in the design view.

11. A computer program product for use at a computer system including an editor having a text view and a design view for editing documents, the text view configured to receive text representing instructions of a mark-up language, the design view configured to interpret the mark-up language and to render corresponding output, the computer program product of implementing a method for automatically synchronizing the rendered output of the design view with an incremental change made in the text view, the computer program product comprising one or more computer storage media have stored thereon computer-executable instructions that, when executed at a processor, cause the computer system to perform the following:
store a text view of mark-up language instructions of a document in a text view buffer within the text view buffer, the change spanning multiple mark-up language elements within the mark-up language instructions;
detect a change in the text view of the document within the text view buffer, the change spanning multiple mark-up language elements within the mark-up language instructions;
identify the type of the detected change from among inserting, deleting, and changing text;
identify an excise region of changed text for the detecting change, the excise region containing a region of changed text that is to be synchronized with the design view, identifying the excise region including:
identifying a change start location of the detected change within the text view buffer;
identifying a change end location of the detected change within the text view buffer; and
determining that the portion of text between the change start location and the change end location is the excise region;
identifying a scoped output region, the scoped output region indicating mark-up language elements potentially impacted by the detected change by being at least partially within the excise region based on the level of the mark-up language elements within the mark-up language instructions, identifying the scoped output region including:
inspecting the text view buffer from the start change location towards the beginning of the text view buffer to identify a scope start location, the scope start location indicating the beginning of the start tag corresponding to the first mark-up language element at least partially within the excise region;
inspecting the text view buffer from the change end location towards the end of the text view buffer to identify a scope end location, the scope end location indicating the end of the end tag corresponding to the start tag at the same level within the mark-up language instructions; and determining that the text from the beginning of the start tag to the end of the end tag is the scope output region,
determine that it is safe to use incremental parsing to re-parse the excise region of the document based on mark-up language elements contained in the scoped output region;
re-parse the excise region to generate further mark-up language instructions for insertion into the excise region without having to re-parse the entire document;
insert the further mark-up language instructions into the excise region to implement the detected change;
the further mark-up language instructions into a design view parse tree used by the design view to render the document such that the detected change is synchronized between the text view and the design view; and
render the design view parse tree to represent the detected change from text view within the design view.

12. The computer-program product as recited in claim 11, further comprising computer-executable instructions that, when executed at a processor, cause the computer system to perform the following:
load the mark-up language instructions of the document to a text parser;
parse the mark-up language instructions of the document into a parsed copy of the document, the parsed copy of the document separating the contents of the document into various elements included in the document; and
store the parsed copy of the document in memory.

13. The computer-program product as recited in claim 11, wherein computer-executable instructions that, when executed at a processor, cause the computer system to detect a change in the text view of the document comprises computer-executable instructions that, when executed at a processor, cause the computer system to detect a change to HTML instructions in the text view.

14. The computer program product as recited in claim 13, wherein computer-executable instructions that, when executed at a processor, cause the computer system to detect a change to HTML instructions in the text view comprise computer-executable instructions that, when executed at a processor, cause the computer system to detect one of a plain text change, a change completely enclosing an HTML element, a change completely enclosing multiple HTML elements, a change to HTML element attribute sets, and a change to HTML element attribute values.

15. The computer program product as recited in claim 11, wherein computer-executable instructions that, when executed at a processor, cause the computer system to re-parse the excise region to generate further mark-up language instructions for insertion into the excise region comprise computer-executable instructions that, when executed at a processor, cause the computer system to ~re-parse a portion of HTML instructions.

16. The computer program product as recited in claim 11, wherein computer-executable instructions that, when executed at a processor, cause the computer system to insert the further mark-up language instructions into the excise region comprises an act of inserting the further mark-up language instructions back into the text view buffer.

17. The computer program product as recited in claim 11, wherein computer-executable instructions that, when executed at a processor, cause the computer system to render the parse tree to represent the detected change from text view within the design view comprises computer-executable instructions that, when executed at a processor, cause the computer system to render HTML instructions in the design view.

18. A computer system configured with an editor having a text view and a design view for editing documents, the text view configured to receive text representing instructions of a mark-up language, the design view configured to interpret the mark-up language and to render corresponding output, the computer system comprising:
- one or more processors;
- system memory; and
- one or more computer-readable media having stored thereon computer-executable instructions of a document development infrastructure, the document development infrastructure configured to:
  - store a text view of mark-up language instructions of a document in a text view buffer;
  - detect a change in the text view of the document;
  - identify the type of the detected change from among inserting, deleting, and changing text;
  - identify a change start location of the detected change within the text view buffer;
  - identify a change end location of the detected change within the text view buffer, the portion of text between the change start location and the change end location representing the excise region of the changed text that is to be synchronized in the design view while preserving the existing characteristics of other mark-up language in the document;
  - inspect the text view buffer from the start change location towards the beginning of the text view buffer to identify a scope start location;
  - inspect the text view buffer from the change end location towards the end of the text view buffer to identifying a scope end location, the portion of the text view buffer between the scope start location and the scope end location indicating a scoped output region;
  - determine that it is safe to use incremental parsing in the excise region of the document based on the contents of the scoped output region;
  - access mark-up language corresponding to the excise region of the document;
  - insert the accessed mark-up language into the excise region of the document;
  - transfer the accessed mark-up language to a design view parse tree used by the design view to render the document such that the detected change is synchronized between the text view and the design view; and
  - render the design view parse tree to represent the detected change from text view within the design view.

* * * * *